United States Patent
Binet et al.

(10) Patent No.: US 11,801,933 B2
(45) Date of Patent: Oct. 31, 2023

(54) DEVICE FOR DETECTING THE APPROACH OF A VORTEX RING STATE, ROTARY-WING AERODYNE COMPRISING SAID DEVICE, AND ASSOCIATED METHOD

(71) Applicants: ETAT FRANÇAIS REPRÉSENTÉ PAR LE DÉLÉGUÉ GÉNÉRAL DE L'ARMEMENT, Paris (FR); OFFICE NATIONAL D'ETUDES ET DE RECHERCHES AÉROSPATIALES (ONERA), Palaiseau (FR)

(72) Inventors: Laurent Binet, Grans (FR); Stéphane Pezet, Saint Mitre les Remparts (FR); Marc Prunel, Aix-en-Provence (FR)

(73) Assignees: ETAT FRANÇAIS REPRÉSENTÉ PAR LE DÉLÉGUÉ GÉNÉRAL DE L'ARMEMENT, Paris (FR); OFFICE NATIONAL D'ETUDES ET DE RECHERCHES AÉROSPATIALES (ONERA), Palaiseau (FR)

( * ) Notice: Subject to any disclaimer, the term of this patent is extended or adjusted under 35 U.S.C. 154(b) by 3 days.

(21) Appl. No.: 17/624,229

(22) PCT Filed: Jun. 26, 2020

(86) PCT No.: PCT/IB2020/056053
§ 371 (c)(1),
(2) Date: Dec. 30, 2021

(87) PCT Pub. No.: WO2021/001734
PCT Pub. Date: Jan. 7, 2021

(65) Prior Publication Data
US 2022/0355919 A1    Nov. 10, 2022

(30) Foreign Application Priority Data
Jul. 3, 2019    (FR) ..................... 1907082

(51) Int. Cl.
*B64C 27/00*    (2006.01)
*B64C 19/00*    (2006.01)
(Continued)

(52) U.S. Cl.
CPC ............ B64C 27/006 (2013.01); B64C 19/00 (2013.01); G01H 1/003 (2013.01); G01P 15/18 (2013.01)

(58) Field of Classification Search
CPC ...... G01H 1/003; B64C 27/006; B64C 19/00; G01P 15/18
See application file for complete search history.

(56) References Cited

U.S. PATENT DOCUMENTS 9,037,316 B2    5/2015    Abildgaard et al.
10,843,810 B2    11/2020    Quaranta
(Continued)

FOREIGN PATENT DOCUMENTS

| EP | 1 400 885 | 3/2004 |
| EP | 3 406 520 | 11/2018 |
| WO | 2012/007157 | 1/2012 |

OTHER PUBLICATIONS

Search Report and Written Opinion for FR Application No. 1907082 dated Oct. 9, 2020, 5 pages.
(Continued)

*Primary Examiner* — Helen C Kwok
(74) *Attorney, Agent, or Firm* — NIXON & VANDERHYE

(57) ABSTRACT

A device for detecting the approach of a vortex ring state for a rotary wing aerodyne, the detection device including a set of vibration sensors configured to be distributed in or on the aerodyne, and a data processing unit configured to receive in real time measurement data from the sensors, process the data in order to calculate in real time the vibration spectrum
(Continued)

of the aerodyne, detect in real time, by vibration analysis, the approach of a vortex ring state as a function of the calculated vibration spectrum, and issue an alarm in the event of detection of the approach of a vortex ring state.

19 Claims, 3 Drawing Sheets

(51) Int. Cl.
  *G01P 15/18* (2013.01)
  *G01H 1/00* (2006.01)

(56) References Cited

U.S. PATENT DOCUMENTS

| | | | |
|---|---|---|---|
| 2004/0050999 A1* | 3/2004 | Hill | G05D 19/02 244/17.27 |
| 2005/0004721 A1* | 1/2005 | Einthoven | G05D 1/0858 701/4 |
| 2006/0006279 A1 | 1/2006 | Kisor | |
| 2009/0089006 A1* | 4/2009 | Certain | B64C 27/006 702/144 |
| 2013/0173091 A1* | 7/2013 | Abildgaard | B64C 27/006 701/4 |
| 2017/0369181 A1* | 12/2017 | Certain | B64C 27/006 |
| 2018/0231406 A1* | 8/2018 | Xu | G01F 1/3209 |
| 2018/0339791 A1* | 11/2018 | Quaranta | B64D 45/00 |
| 2018/0370624 A1* | 12/2018 | Seale | B64C 29/0033 |
| 2021/0383618 A1* | 12/2021 | Cerqueira | G07C 5/006 |

OTHER PUBLICATIONS

International Search Report for PCT/IB2020/056053 dated Oct. 9, 2020, 5 pages.

Written Opinion of the ISA with translation for PCT/IB2020/056053 dated Jun. 26, 2020, 9 pages.

Yeates, "Flight measurements of vibration experiences by tandem helicopter in transition, vortex-ring state, landing approach, and yawed flight", NACA-Technical Note: TN 4409, XP002799003, Sep. 1958, 22 pages.

Varnes, "Development of a HelicopterVortex Ring State Warning System Through a Moving Map Display Computer", Naval Postgraduate School Thesis, Sep. 1, 1999, XP009100651, Monterey, California, 153 pages.

* cited by examiner

DEVICE FOR DETECTING THE APPROACH OF A VORTEX RING STATE, ROTARY-WING AERODYNE COMPRISING SAID DEVICE, AND ASSOCIATED METHOD

This application is the U.S. national phase of International Application No. PCT/IB2020/056053 filed Jun. 26, 2020 which designated the U.S. and claims priority to French Patent Application No. 1907082 filed Jul. 3, 2019, the entire contents of each of which are hereby incorporated by reference.

BACKGROUND OF THE INVENTION

Field of the Invention

The present invention relates to the field of rotary wing aerodynes, and in particular to a vortex ring state approach detection device for a rotary wing aerodyne, to a rotary wing aerodyne comprising said device, and to a method of detecting the approach of a vortex ring state.

Description of the Related Art

Improving the safety during flights of rotary wing aerodynes, especially of the helicopter type, and reducing the number of accidents and incidents involving rotary wing aerodynes is a constant focus of research for manufacturers and operators in the field of rotary wing aerodynes.

A rotary wing aerodyne is usually equipped with at least one main rotor that provides both lift and propulsion to the aerodyne. Under normal operating conditions, the rotating rotor (driven by one or more motors) draws in air from upstream. The air passes through the rotor from top to bottom, and is accelerated by the induced rotor speed, thus generating lift.

A potentially dangerous area of operation of rotary wing aerodynes is the vortex ring state, or as it is known to the skilled person, the "vortex phenomenon".

The vortex ring state is a particular regime of operation of main rotor that can occur in descent flight at low forward speeds, typically less than 25 knots, and at moderate rates of descent, typically of the order of −1000 feet per minute. In this situation, the rotary wing aerodyne may enter its own rotor wake, leading to re-ingestion of air streams at the tip of the rotor disc.

The vortices thus created lead to an increase in vibrations, a loss of lift (comparable to a stall on fixed-wing aerodynes) and a reduced controllability of the rotary-wing aerodyne. The result is a significant loss of altitude, which can be fatal in the case of an aerodyne close to the ground when the vortex phenomenon appears, particularly during the approach phases.

There is, however, considerable uncertainty as to the conditions under which the vortex ring state occurs. For example, during vortex entry flight tests with a Sud-Aviation Dauphin helicopter, the vortex phenomenon appeared for vertical speeds ranging from −800 feet per minute to −1500 feet per minute over a range of forward speeds from hovering to 20 knots, and only for cases representative of an approach phase (i.e., low descent rate). The appearance of the vortex phenomenon is strongly related to the dynamics of the rotary wing aircraft. It is easy to understand, for example, that the attitude of the rotor disc or its dynamics modifies the blade-vortex interaction, and therefore the conditions and characteristics of the entry into vortex phenomenon.

Flight tests have also shown that flight conditions that are extremely close in terms of forward speed and descent rate may or may not lead to the appearance of a vortex phenomenon. As the vortex domain depends on many parameters, a priori definition of the vortex domain is not easy and large safety margins have to be taken, thus limiting the flight domain considered as safe.

In addition to the fact that the definition of an estimated vortex ring state domain is not sufficient to guarantee with certainty the non-entry into ring state without the need for substantial safety margins, there is currently no really effective and accurate method for measuring or estimating the air speed of the rotary wing aerodyne in the low speed domain. The lack of knowledge of the precise limits of this vortex domain and the inability to measure the influencing parameters still lead to many accidents today.

US patent application US2009089006A1 describes a method for detecting the approach of the vortex phenomenon. However, this method is based on state estimators, i.e. models, which are potentially flawed and do not measure the phenomenon or its consequences directly.

US patent application US2006006279A1 describes a control system to prevent vortex phenomenon by measuring the rotor mast torque. Specifically intended for tilt-rotor aerodynes, the detection of a difference between the two mast-rotor torques indicates the potential entry of one of the rotors into vortex phenomenon. A sudden decrease in rotor torque on a helicopter is also taken into account and considered to be a forerunner of the vortex phenomenon. Specific commands are then sent to the blades to delay the formation of vortex rings around the rotor disc. The variation of the rotor torque is a known phenomenon at the entry of the vortex phenomenon, linked to the variation of the loads on the rotor due to the presence of the vortices. However, this US patent application is more specifically concerned with the generation of the signals to be sent to the blades rather than the means of detecting the approach of the vortex phenomenon, the measurement of the rotor torque being already a basic parameter measured on rotary wing aerodynes.

The international PCT application WO2012007157A1 concerns the identification of the change in the aerodyne behaviour in terms of vertical speed following actions on the collective pitch. The models of the evolution of the induced speed of the main rotor during descent show indeed a change in the behaviour of the collective pitch/vertical speed curve as the vortex phenomenon approaches. It seems that, for the same action on the collective pitch, the vertical speed response is slightly different when approaching the vortex phenomenon. However, this change in behaviour is very difficult to measure in flight. Furthermore, in order to measure the vertical speed response to collective pitch actions, it is necessary to send collective pitch inputs to the rotor during flight, and in particular when approaching the vortex zone. Such inputs could potentially cause the aerodyne to enter a vortex phenomenon if it is approaching without the pilot being aware of it.

The vortex phenomenon involves the stalling of the rotor disc, and therefore a loss of lift and an increase in descent rate (resulting in a significant loss of altitude). It is often this increase in vertical speed that serves as an indicator to the pilot that he has entered the vortex phenomenon, and it is usually already too late to avoid an accident. The change in the vibration spectrum is also an indicator for experienced pilots, but few are sufficiently familiar with this phenomenon and, on the other hand, the vibrations felt are quite similar to those that can be felt during other phases of flight (e.g. flight in BVI (Blade Vortex Interaction) conditions, flapping, dynamic manoeuvres, turning under load factor, etc.).

However, the intensity of the vortex phenomenon is not systematically the same, and depends in particular on the forward speed at which the aerodyne is and/or the way in which the aerodyne approaches the vortex domain (e.g. during deceleration, an increase in descent rate at constant forward speed, etc.). If, however, the detection was not done early enough, or if the pilot did not react appropriately to avoid entering the vortex phenomenon (due to lack of knowledge of the phenomenon or some other reason), a system that could clearly indicate to the pilot that the aerodyne has indeed entered the vortex phenomenon would be a very valuable contribution.

In addition, pilots are rather sensitive to low frequencies and changes in the high frequency vibration spectrum are not felt by them. However, the vortex phenomenon can be characterized by an increase in vibrational intensity up to high frequencies.

In the publication "Flight measurements of the vibration experienced by a tandem helicopter in transition, vortex-ring state, landing, approach, and yawed flight", by J. E. Yeates, Technical Note 4409, National Advisory Committee for Aeronautics, September 1958, vibration measurements were made on a tandem type aircraft in several flight conditions including the vortex phenomenon. It is stated that the vibration measured in the vortex phenomenon is characterized by a large irregular pulse of the vibration envelope at a random frequency, which probably indicates vortex effusion. However, this study did not include a device and method to detect the approach of the vortex phenomenon, and no further description of the changes in the vibration spectrum caused by the vortex phenomenon was given, the study only acknowledging an a posteriori change in the vibration envelope once the aircraft was in the vortex.

European patent application EP3406520A1 describes a method of anticipating entry into a vortex domain by a rotorcraft, in which the approach of the vortex is detected by measuring a parameter characterizing the evolution of the airflow around the rotor of the rotorcraft, such as a velocity or pressure, using a single sensor. However, this existing method has a lower robustness of detection than a method using several vibration sensors arranged in several locations of the aircraft to detect an indirect manifestation of the vortex phenomenon. The present invention aims at solving the drawbacks of the prior art, by providing a device and a method for detecting the approach of a vortex ring state for a rotary wing aerodyne, by calculating in real time the vibrational spectrum of the rotary wing aerodyne along at least one of the longitudinal and vertical axes of the rotary wing aerodyne, and detection or not in real time, by vibration analysis, of the approach of a vortex ring state as a function of the calculated vibration spectrum, which makes it possible to detect the approach of the vortex ring state accurately and effectively by real-time analysis of the vibration signature of the rotary wing aerodyne.

SUMMARY OF THE INVENTION

The present invention therefore relates to a device for detecting the approach of a vortex ring state for a rotary wing aerodyne, characterized in that said detection device comprises a set of vibration sensors configured to be distributed in or on the rotary wing aerodyne and configured to detect at different points of the rotary wing aerodyne vibrations at least along the longitudinal and vertical axes of the rotary wing aerodyne, said detection device further comprising a data processing unit connected to the set of vibration sensors, said data processing unit being configured to: receive in real time measurement data from the set of vibration sensors, process the measurement data received so as to calculate in real time the vibration spectrum of the rotary wing aerodyne along at least one of the longitudinal and vertical axes of the rotary wing aerodyne on at least two distinct vibration sensors among the set of vibration sensors, detect or not in real time, by vibration analysis, the approach of a vortex ring state according to the calculated vibration spectrum, and issue an alarm in the event of detection of the approach of a vortex ring state.

Thus, the detection device according to the present invention aims at protecting the flight envelope from the vortex phenomenon (or vortex ring state) of the rotary wing aerodyne by detecting the approach of this vortex phenomenon through vibration sensor measurements and real time vibration analysis.

The detection device according to the present invention thus makes it possible to identify a vibration signature preceding the appearance of the vortex ring state, so as to issue an alarm in the event of detection of the approach of the vortex ring state.

Based on the direct measurement of vibrations due to the appearance of vortex rings around the rotor disc of the aerodyne, the device according to the present invention has the advantage of detecting the vortex phenomenon itself, through one of its indirect manifestations. The present invention is therefore not based on a behavioural model or an estimation of missing parameters (such as air speed), but instead allows a direct detection of the approach of the vortex phenomenon. Furthermore, the measurements made by the vibration sensors are independent of the flight point of the aerodyne. The measurements are therefore not, for example, impacted by the lack of knowledge of low air speeds.

It should be noted that the direct detection of the vortex phenomenon approach through vibration analysis may, however, if necessary, use a vortex domain model and the corresponding machine parameters to limit the false alarm rate, without departing from the scope of the present invention.

The onset of a characteristic vibration spectrum in the rotary wing aerodyne is due to the passage of the main rotor blades through the vortices before they are sufficiently developed to cause the lift drop. Detection of the onset of the vortex phenomenon by this means is therefore achieved moments before the actual entry into the vortex phenomenon, thus providing a potentially sufficient margin of time to warn the pilot or carry out corrective actions via the rotary wing aerodyne's flight control system.

There are a very large number of causes of vibration on the aerodyne structure, but these are well known and listed. Indeed, each rotating part of the aerodyne (e.g. main rotor, tail rotor, turbine, gear system, etc.) causes a vibration at a distinct, known and identifiable frequency. Knowledge of the rotation speeds of the various rotating parts of the aerodyne thus provides the frequency spectrum and their harmonics that can be measured. The analysis of numerous flight cases, during entries into vortex phenomenon or not, has shown that the approach of the vortex ring state can be detected by a change in the aerodyne's vibration signature, with: a variation in the vibration level at both low and high frequencies; and a modification of the structure of the vibration spectrum (the rotor frequency no longer being predominant).

According to a particular feature of the invention, each vibration sensor is a three-axis accelerometer, namely a longitudinal axis X corresponding to the longitudinal axis of the rotary wing aerodyne, a transverse axis Y corresponding to the transverse axis of the rotary wing aerodyne and a vertical axis Z.

As the main rotor is mechanically linked to the aerodyne structure, the vibrations of the main rotor are transmitted to the aerodyne structure. These vibrations are thus measured using three-axis accelerometers placed at different locations on or in the aerodyne.

Thus, each three-axis accelerometer type vibration sensor allows the vibrations experienced by the aerodyne to be measured at the installation location of said vibration sensor, whereby the vibrations can be measured in real time along the three axes X, Y and Z of the accelerometer.

The measurement data from the vibration sensors is preferably sampled at a frequency of 4000 Hz to ensure a frequency measurement bandwidth of up to 2000 Hz.

According to a particular feature of the invention, the vibration sensor set comprises a first three-axis accelerometer configured to be installed in the cabin of the rotary wing aerodyne, a second three-axis accelerometer configured to be installed on the main gearbox of the rotary wing aerodyne, and a third three-axis accelerometer configured to be installed on the engine deck of the rotary wing aerodyne proximate to the centre of gravity of the rotary wing aerodyne.

The first accelerometer is preferably installed under the pilot's seat in the cabin of the aerodyne.

The second accelerometer is preferably installed on the lower fitting of the left rear suspension bar of the main gearbox of the aerodyne.

The vibration measurement data from the three accelerometers is then sent to the computer type data processing unit for frequency analysis processing of this data, so as to detect or not the approach of the vortex ring state.

According to a particular feature of the invention, the data processing unit is configured to perform at least one of: a first vibration analysis on the measurement data streams corresponding to the longitudinal axis X and the vertical axis Z of the second three-axis accelerometer comprising, for each of the measurement data streams corresponding to the longitudinal axis X and the vertical axis Z of the second three-axis accelerometer, the comparison of the fundamental frequency of the main rotor of the rotary wing aircraft with the predominant frequency, i.e. corresponding to the maximum amplitude level, of the vibration spectrum derived from a discrete Fourier transform on the corresponding measurement data stream, and, if the difference between the predominant frequency and the fundamental frequency of the main rotor is greater than a predetermined frequency difference threshold, the generation of a detection signal associated with the corresponding measurement data stream; and a second vibration analysis on the measurement data streams corresponding to the vertical axis Z of the first three-axis accelerometer and corresponding to the longitudinal axis X and vertical axis Z of the third three-axis accelerometer comprising, for each of the measurement data streams corresponding to the vertical axis Z of the first three-axis accelerometer and corresponding to the longitudinal axis X and vertical axis Z of the third three-axis accelerometer, the digital filtering without phase shifting of the corresponding measurement data stream using a low-pass finite impulse response filter and a high-pass finite impulse response filter; the calculation of the RMS value of the signal from the low-pass filter and of the RMS value of the signal from the high-pass filter, the calculation of an energy ratio corresponding to the RMS value of the signal from the high-pass filter divided by the RMS value of the signal from the low-pass filter, and, if the energy ratio is greater than a corresponding predetermined energy ratio threshold, the generation of a detection signal associated with the corresponding measurement data stream.

Thus, at least one of the first and second vibration analyses is performed by the data processing unit, so as to detect or not the approach of the vortex ring state upon detection of a specific change in the vibration signature of the aerodyne, both vibration analyses may also be performed successively or simultaneously by the data processing unit.

Of the nine measurement channels provided by the three three-axis accelerometers, only five channels are thus used for data processing and vibration analysis, namely:

for the first vibration analysis, the channels corresponding to the longitudinal axis X and vertical axis Z of the second three-axis accelerometer (hereinafter referred to as "channel 2" and "channel 3", respectively); and for the second vibration analysis, the channel corresponding to the vertical axis Z of the first three-axis accelerometer (hereinafter referred to as "channel 1") and the channels corresponding to the longitudinal axis X and vertical axis Z of the third three-axis accelerometer (hereinafter referred to as "channel 4" and "channel 5", respectively).

The first vibration analysis concerns channels 2 and 3 of the accelerometers, and consists in comparing the fundamental frequency of the main rotor corresponding to the current speed of the main rotor ($F_{rotor}=(NR*b)/60$, with $F_{rotor}$ the fundamental frequency of the main rotor, NR the rotation speed of the main rotor, and b the number of blades of the main rotor) and the predominant frequency (frequency corresponding to the maximum level of amplitude) of the vibration spectrum resulting from a discrete Fourier transform carried out on the streams of measurement data from channels 2 and 3. A weighting window of the "hanning" type is preferably used in the calculation of the discrete Fourier transform, the latter preferably being 2 seconds wide, equivalent to 8000 data samples, with a refresh rate of 0.0625 s.

Thus, during this first vibration analysis, if the predominant frequency is different (beyond the frequency difference threshold predetermined by the flight test analysis and which can be adapted according to the aerodyne) from the fundamental frequency of the rotor $F_{rotor}$, then a detection signal is generated by the first vibration analysis on the corresponding channel. This first vibration analysis can therefore potentially provide two detection signals, namely a possible detection signal associated with channel 2 and a possible detection signal associated with channel 3.

The second vibration analysis is performed on channels 1, 4 and 5 of the accelerometers. Over a range of data from these channels (e.g. N=8000 samples), digital filtering without phase-shifting is carried out, using low-pass (preferably of order 100) and high-pass (preferably 150 Hz cut-off frequency) finite impulse response (FIR) filters (preferably of order 100), with each measurement data stream filtered in this way having two signals, hereinafter referred to as $x_{low}$ and $x_{high}$.

The RMS (Root Mean Square) value of each of the filtered streams is then calculated, for example for the signal from the high-pass filter:

$$RMS_{high} = \sqrt{\frac{1}{N}\left[\sum_{i=1}^{N}(x_{high})^2\right]} \quad \text{[Math 1]}$$

where $RMS_{high}$ is the RMS value from the high-pass filter and N is the number of samples.

Then, an "energy ratio" corresponding to the RMS value of the signal from the high-pass filter divided by the RMS value of the signal from the low-pass filter is calculated: $ER=RMS_{high}/RMS_{low}$, where ER is the energy ratio, $RMS_{high}$ is the RMS value of the signal from the high-pass filter and $RMS_{low}$ is the RMS value of the signal from the low-pass filter Each "energy ratio" of channels 1, 4 and 5 has a specific predetermined energy ratio threshold.

For a detection signal to be generated by the second vibration analysis, one of the energy ratios must therefore be greater than its predetermined specific energy ratio threshold.

It should be noted that the thresholds used in both vibration analyses could also be modified depending on the type of aerodyne and/or the type of main rotor. According to a particular feature of the invention, the data processing unit is configured to perform the first vibration analysis and the second vibration analysis simultaneously.

Thus, since both vibration analyses are performed simultaneously on the measurement data from the accelerometers, the detection of a change in the aerodyne's vibration signature is more accurate and reliable, thus avoiding the generation of false alarms.

Furthermore, since a significant increase in the energy of the vibrational intensity at high frequencies is not a specific feature of the vortex ring state, it follows that the combination of both vibrational analyses is preferable in order not to generate false alarms.

According to a particular feature of the invention, the data processing unit is configured to perform a third vibration analysis comprising: applying a Hilbert transform to the measurement data stream corresponding to the vertical axis Z of the first three-axis accelerometer allowing the real signal to be extended into the complex domain; applying a Fast Fourier Transform (FFT) to the Hilbert transformed signal; and filtering the FFT signal by plus or minus 5 Hz around the fundamental main rotor frequency corresponding to the current main rotor speed (Frotor=(NR*b)/60, where Frotor is the fundamental main rotor frequency, NR is the main rotor speed, and b is the number of main rotor blades); reconstructing the filtered signal by applying an inverse Fourier transform; producing a spectrogram on the reconstructed signal and removing the negative frequency part of the spectrum; calculating the standard deviation of the amplitude of the spectrogram over a sliding window of a predefined duration; and, if the calculated standard deviation is above a predefined threshold, generating a detection signal. It should be noted that this third vibration analysis is totally independent of the first and second vibration analyses and can replace them. However, for greater robustness, this third vibration analysis can also be associated with the first and second vibration analyses in order to correlate the detections and potentially avoid false alarms. According to a particular feature of the invention, the data processing unit is configured to detect the approach of a vortex ring state and issue an alarm when the first vibration analysis and the second vibration analysis simultaneously generate at least one detection signal.

Thus, in order to issue an alarm indicating the approach of the vortex ring state, the two separate vibration analyses must generate at least one detection signal simultaneously, thus avoiding the generation of false alarms.

According to a particular feature of the invention, the data processing unit is configured to detect the approach of a vortex ring state and generate an alarm when at least three detection signals from the first and second vibration analyses are generated simultaneously.

Thus, in this case, the vortex ring state is considered to be close when at least three detection signals are generated jointly by the two vibration analyses, which further avoids the generation of false alarms and improves the detection reliability of the approach of the vortex phenomenon.

According to a particular feature of the invention, the data processing unit is further configured to use at least one of the following measurements to detect the approach of a vortex ring state: the measurement of the indicated speed of the rotary wing aerodyne, the measurement of the vertical speed of the rotary wing aerodyne, and the measurement of the main rotor speed of the rotary wing aerodyne.

Thus, the data processing unit can also use the measurements provided by the basic instrumentation of the rotary wing aerodyne when detecting the approach of the vortex ring state, so as to obtain additional information on the flight domain in which the aerodyne is at the current time. This is to avoid false alarms if the vibration level increases significantly while the aerodyne is clearly outside the vortex domain (e.g. during dynamic manoeuvres at high forward speeds, or during a climbing flight).

The basic instrumentation of the aerodyne thus allows the retrieval of measurements of indicated airspeed, vertical speed and main rotor rotation speed.

It should be noted that, although the on-board inertial unit of the aerodyne provides the accelerations measured at the centre of gravity of the aerodyne, this "basic" information provided by the inertial unit cannot be used alone to perform the vibration analysis. Indeed, the sampling rate of the inertial unit is far too low (of the order of a few Hertz) to carry out a sufficiently fine and wide bandwidth frequency analysis. In addition, filters are applied to modify the signal that can be analyzed.

In the first vibration analysis, the main rotor rotation speed measurement can be used by the data processing unit to determine the fundamental frequency of the main rotor.

In each of the first and second vibration analyses, the indicated speed measurement and the vertical speed measurement may, for example, be used by the data processing unit as follows: generate the detection signal only if in addition the indicated speed measurement is less than 25 knots and the vertical speed measurement is less than −700 feet per minute.

According to a particular feature of the invention, the detection device further comprises a warning unit connected to the data processing unit and configured to generate a vortex ring state approach warning when the data processing unit issues an alarm, said vortex ring state approach warning being at least one of audible, visual and haptic.

The time margin available between the moment of detection, made by real-time vibration measurement and analysis, and the appearance of the vortex phenomenon plays an important role in the effectiveness of the vortex phenomenon avoidance. This time margin allows the implementation of the pilot warning function of the aerodyne, so that the pilot can avoid the appearance of the vortex ring state by modifying the piloting of the aerodyne.

The warning, generated in the event of approaching vortex ring state in order to alert the aerodyne crew, may be one of an audible warning from at least one loudspeaker arranged in the aerodyne cabin, a visual warning from at least one light indicator and/or at least one display arranged in the aerodyne cabin, and a haptic warning (e.g. by haptic feedback on the aerodyne control stick).

The present invention also relates to a rotary wing aerodyne comprising a device for detecting the approach of a vortex ring state as described above, the set of vibration sensors of said detection device being distributed in or on the rotary wing aerodyne.

According to a particular feature of the invention, the rotary wing aerodyne further comprises a flight control system connected to the data processing unit of the detection device and configured to automatically or semi-automatically modify the piloting of the rotary wing aerodyne when the data processing unit of the detection device issues an alarm, so as to prevent the entry of the rotary wing aerodyne into the vortex ring state.

Thus, the time margin available between the moment of detection and the appearance of the vortex phenomenon allows the implementation of a pilot assistance function via the aerodyne's flight control system.

In case of detection of the approach of the vortex ring state by the detection device installed in the aerodyne, the flight control system of the aerodyne can thus automatically or semi-automatically modify the flight parameters of the aerodyne in order to prevent the aerodyne from entering the vortex ring state (e.g. by reducing the descent rate or actions on the swashplate (longitudinal or lateral)).

The present invention further relates to a method of detecting the approach of a vortex ring state by a rotary wing aerodyne as described above, said method comprising, by the data processing unit of the vortex ring state approach detection device: receiving in real time measurement data from the set of vibration sensors; processing the received measurement data so as to calculate in real time the vibration spectrum of the rotary wing aircraft on at least two distinct vibration sensors among the set of vibration sensors; detecting or not in real time, by vibration analysis, the approach of a vortex ring state according to the calculated vibration spectrum; and issuing an alarm in case of detection of the approach of a vortex ring state.

BRIEF DESCRIPTION OF THE DRAWINGS

To better illustrate the object of the present invention, a preferred embodiment is described below, by way of illustration and not limitation, with reference to the attached drawings.

On these drawings:

FIG. 2b is an example graph showing the lift of the helicopter-type rotary wing aerodyne as a function of time during the test flight in FIG. 2a;

DESCRIPTION OF THE PREFERRED EMBODIMENTS

Figure 1:
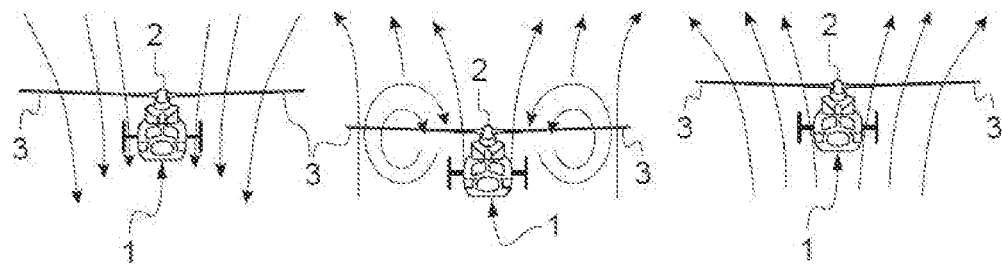
FIG. 1 shows three front views of a helicopter-type rotary wing aerodyne in climbing, vortex ring state and descent, respectively.

Referring to FIG. 1, it can be seen that a helicopter-type rotary wing aerodyne 1 is shown in three different flight conditions.

The rotary wing aerodyne 1 is equipped with a main rotor 2 which provides both lift and propulsion for the aerodyne 1, said main rotor 2 carrying a number of blades 3.

In FIG. 1, for each of the three views, the arrows represent the direction of airflow around the main rotor 2 of the rotary wing aerodyne 1.

In the level ground/ascent condition, shown in the left-hand side view of FIG. 1, the rotating main rotor 2 draws in air from upstream. The air passes through the circumference of the rotor blades 3 of the rotor 2 from top to bottom, and is accelerated by the induced speed of the rotor 2, thus generating the lift of the aerodyne 1.

On the contrary, in the high descent rate condition, shown in the right-hand side view of FIG. 1, the air flows through the circumference of the rotor blades 3 from the bottom to the top, causing the aerodyne 1 to descend.

The vortex ring state (or vortex phenomenon) is a particular regime of main rotor 2 operation that can occur in descent flight at low forward speeds, typically less than 25 knots, and at moderate rates of descent, typically of the order of −1000 feet per minute. In this situation, shown in the central view of FIG. 1, the rotary wing aerodyne 1 may enter its own rotor wake, leading to re-ingestion of air streams at the tip of the rotor disc.

The vortices thus created lead to an increase in vibrations, a loss of lift and a reduced controllability of the rotary wing aerodyne 1. This results in a significant loss of altitude, which can be fatal if the aerodyne 1 is close to the ground when the vortex phenomenon occurs, particularly during the approach phases.

Figure 2A:
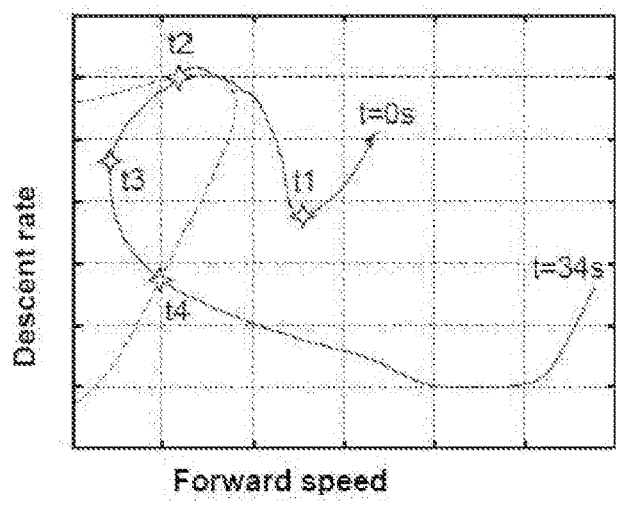
FIG. 2a is an example graph showing the descent rate of a helicopter-type rotary wing aerodyne as a function of its forward speed during a test flight.
Figure 2B:
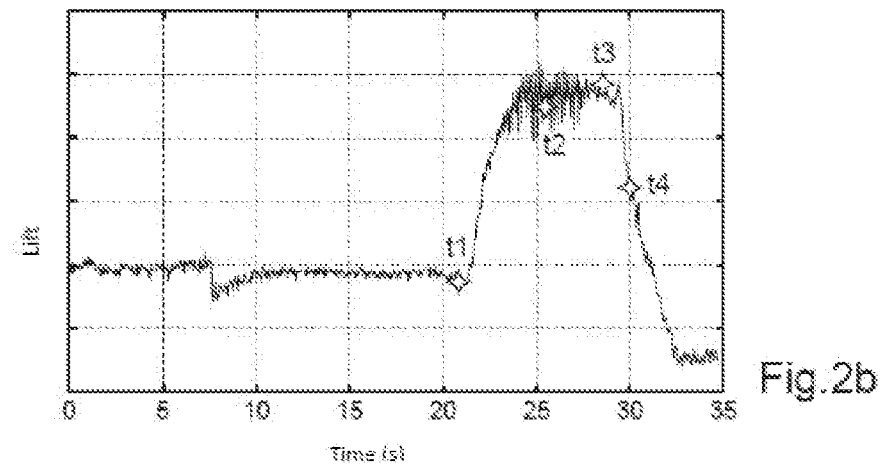

Referring to FIG. 2a, it can be seen that there is an example graph in which the solid line curve represents the descent rate of a helicopter type rotary wing aerodyne 1 as a function of its forward speed during a test flight, and referring to FIG. 2b, it can be seen that there is an example graph in which the curve represents the lift as a function of time during the test flight of FIG. 2a.

The duration of the test flight ranges from 0 s to 34 s, with times t1, t2, t3 and t4 between 0 and 34 s.

The vortex phenomenon or vortex ring state is due to the appearance around the rotor disc of vortex rings generated by the re-ingestion by the rotor 2 of its own flow, the latter being blocked by the air mass present under the rotary wing aerodyne 1.

The random formation and decay of these vortices over time creates a highly disturbed and unsteady flow around the rotor 2. Moving in this environment, the blades 3 are then subjected to a strongly disturbed aerodynamic field, which modifies in a significant way their local incidences, and thus their loads. Lift and drag are then strongly modified, resulting in a vibration level different from that measurable in normal flight conditions as can be seen in FIGS. 2a and 2b, where the lift is measured over time in different operation regimes of the rotor 2 during descent. From time t=0 s to t1, the aerodyne 1 is at high rates of descent but at a sufficient forward speed not to be near the vortex domain. Between t1 and t2, the pilot reduces the rate of descent by increasing the lift. In addition, by reducing the forward speed, he enters a vortex ring state between times t2 and t4. In FIG. 2b, we can therefore see a strong increase in lift fluctuations during this phase of flight in a vortex ring state between instants t2 and t4.

The dotted curve in FIG. 2a represents the vortex domain within which the aerodyne 1 enters the vortex ring state.

Once entered into vortex ring state, the aerodynamics on blades 3 is so disturbed that a sudden loss of lift occurs, leading to an important loss of altitude that can be potentially dangerous. However, before this happens, the vortices begin to form and alter the aerodynamics on the blades 3, and thus alter the vibrational response of the main rotor 2, and then the vibrational response of the rest of the rotary wing aerodyne 1.

Figure 3:
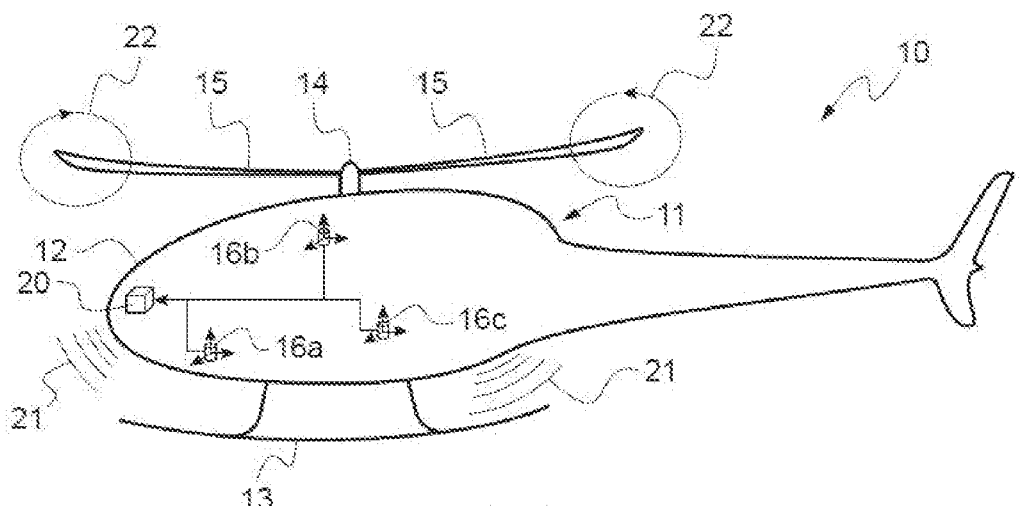
FIG. 3 is a schematic side view of a helicopter-type rotary wing aerodyne comprising a vortex ring state approach detection device according to the present invention.
Figure 4:
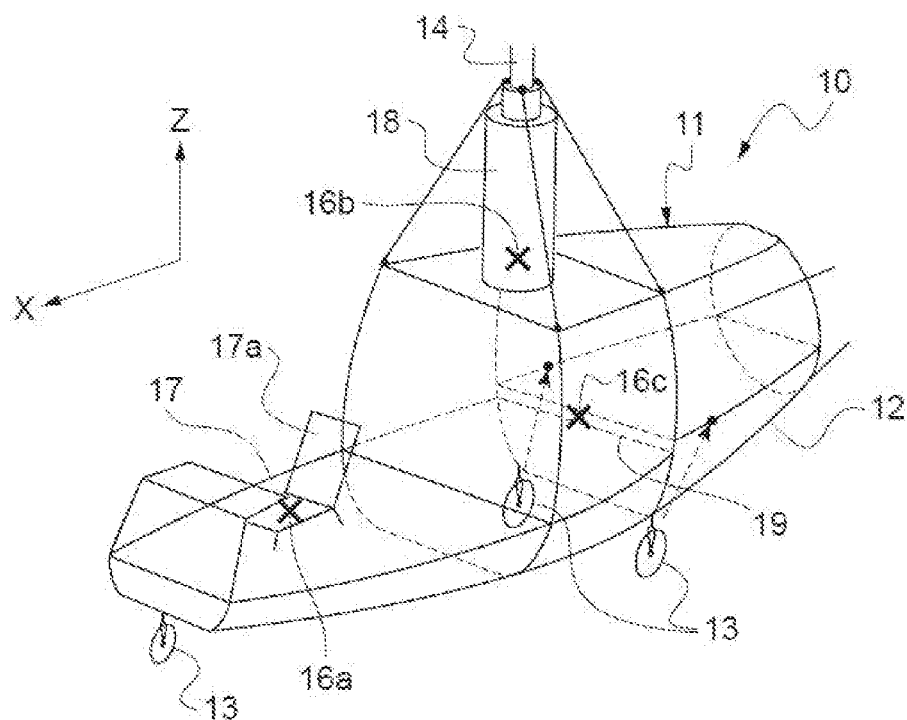
FIG. 4 is a schematic perspective view of the aerodyne structure of FIG. 3.

Referring to FIGS. 3 and 4, it can be seen that a helicopter type rotary wing aerodyne 10 is shown according to the present invention.

The helicopter type rotary wing aerodyne 10 comprises an airframe 11 consisting of a fuselage 12 and a landing gear 13.

The rotary wing aerodyne 10 further comprises a main rotor 14 carrying a plurality of blades 15.

It should be noted that some parts of the aerodyne 10, such as the blades 15, the tail of the fuselage 12 and the cabin fairing in the fuselage 12, have not been shown in FIG. 4, so as not to overload the drawing.

The rotary wing aerodyne 10 according to the present invention further comprises a device for detecting the approach of a vortex ring state comprising three vibration sensors 16a, 16b, 16c arranged in the rotary wing aerodyne 1 and configured to detect at different points of the rotary wing aerodyne 10 vibrations at least along the longitudinal axis X and the vertical axis Z (shown in FIG. 4) of the rotary wing aerodyne 10.

As the main rotor 14 is mechanically linked to the fuselage 12 of the aerodyne 10, the vibrations of the main rotor 14 are transmitted to the fuselage of the aerodyne 10. These vibrations are thus measured in real time using the vibration sensors 16a, 16b, 16c.

It should be noted that the detection device could also comprise at least two vibration sensors 16a, 16b, 16c, without departing from the scope of the present invention.

Each vibration sensor 16a, 16b, 16c is a three-axis accelerometer, namely a longitudinal axis X corresponding to the longitudinal axis of the rotary wing aerodyne 10, a transverse axis Y corresponding to the transverse axis of the rotary wing aerodyne 10 and a vertical axis Z.

The three vibration sensors 16a, 16b, 16c thus consist of a first three-axis accelerometer 16a installed in the cabin 17 of the rotary wing aerodyne 10 under the pilot's seat 17a, a second three-axis accelerometer 16b installed on the main gearbox 18 of the rotary wing aerodyne 10, preferably on the lower fitting of the left rear suspension bar of the main gearbox 18, and a third three-axis accelerometer 16c installed on the engine deck 19 of the rotary wing aerodyne 10 near the centre of gravity of the rotary wing aerodyne 10.

The detection device further comprises a computer type data processing unit 20 connected to the three vibration sensors 16a, 16b, 16c in a wired or wireless manner.

The data processing unit 20 is configured to: receive in real time the vibration measurement data from the three vibration sensors 16a, 16b, 16c; process the vibration measurement data received so as to calculate in real time the vibration spectrum of the rotary wing aerodyne 10 along at least one of the longitudinal X and vertical Z axes of the rotary wing aerodyne 10 on at least two distinct vibration sensors among the three vibration sensors 16a, 16b, 16c; detect or not in real time, by vibration analysis, the approach of a vortex ring state according to the calculated vibration spectrum; and issue an alarm in the event of detection of the approach of a vortex ring state.

The vibration measurement data from the three vibration sensors 16a, 16b, 16c are preferably sampled at a frequency of 4000 Hz to ensure a frequency measurement bandwidth of up to 2000 Hz.

Based on the direct measurement of vibrations 21 due to the appearance of vortex rings 22 on the blades 15 of the main rotor 14, the detection device according to the present invention thus makes it possible to detect the approach of the vortex phenomenon in a reliable manner.

The appearance of a characteristic vibration spectrum in the rotary wing aerodyne 10 is due to the passage of the blades 15 of the main rotor 14 into the vortices 22 before these are sufficiently developed to cause the drop in lift. Detection of the approach of the vortex phenomenon by this means is therefore achieved moments before the actual entry into the vortex phenomenon, thus providing a potentially sufficient margin of time to warn the pilot or perform corrective actions through the flight control system of the rotary wing aerodyne 10, as will be described in more detail later.

In particular, the data processing unit 20 is configured to perform at least one of:

a first vibration analysis on the measurement data streams corresponding to the longitudinal axis X and the vertical axis Z of the second three-axis accelerometer 16b comprising, for each of the measurement data streams corresponding to the longitudinal axis X and the vertical axis Z of the second three-axis accelerometer 16b:

comparing the fundamental frequency of the main rotor 14 of the rotary wing aerodyne 10 with the predominant frequency, i.e. corresponding to the maximum amplitude level, of the vibration spectrum derived from a discrete Fourier transform on the corresponding measurement data stream, and if the difference between the predominant frequency and the fundamental frequency of the main rotor 14 is greater than a predetermined frequency difference threshold, generating a detection signal associated with the corresponding measurement data stream; and a second vibration analysis on the measurement data streams corresponding to the vertical axis Z of the first three-axis accelerometer 16a and corresponding to the longitudinal axis X and vertical axis Z of the third three-axis accelerometer 16c comprising, for each of the measurement data streams corresponding to the vertical axis Z of the first three-axis accelerometer 16a and corresponding to the longitudinal axis X and vertical axis Z of the third three-axis accelerometer 16c digital filtering without phase shifting of the corresponding measurement data stream using a low-pass finite impulse response filter and a high-pass finite impulse response filter;

calculating the RMS value of the signal from the low-pass filter and the RMS value of the signal from the high-pass filter, calculating an energy ratio corresponding to the RMS value of the signal from the high-pass filter divided by the RMS value of the signal from the low-pass filter, and if the energy ratio is greater than a corresponding predetermined energy ratio threshold, generating a detection signal associated with the corresponding measurement data stream.

Of the nine measurement channels provided by the three three-axis accelerometers 16a, 16b, 16c, only five channels are thus used for data processing and vibration analyses, namely:

for the first vibration analysis, the channels corresponding to the longitudinal axis X and the vertical axis Z of the second three-axis accelerometer 16b (hereinafter referred to as "channel 2" and "channel 3", respectively); and for the second vibration analysis, the channel corresponding to the vertical axis Z of the first three-axis accelerometer 16a (hereinafter referred to as "channel 1") and the channels corresponding to the longitudinal axis X and vertical axis Z of the third three-axis accelerometer 16c (hereinafter referred to as "channel 4" and "channel 5", respectively)

The first vibration analysis concerns channels 2 and 3 of the accelerometer 16b, and consists in comparing the fundamental frequency of the main rotor 14 corresponding to the current speed of the main rotor ($F_{rotor}$=(NR*b)/60, where $F_{rotor}$ is the fundamental frequency of the main rotor 14, NR is the speed of rotation of the main rotor 14, and b is the number of blades 15 of the main rotor 14) and the predominant frequency of the vibration spectrum resulting from the discrete Fourier transform carried out on the measurement data streams from channels 2 and 3. A weighting window of the "hanning" type is preferably used in the calculation of the discrete Fourier transform, this preferably being 2 seconds wide, equivalent to 8000 data samples, with a refresh rate of 0.0625 s.

Thus, during this first vibration analysis, if the predominant frequency is different (beyond the frequency difference threshold predetermined by the flight test analysis and which can be adapted according to the aerodyne 10) from the fundamental frequency of the rotor 14 $F_{rotor}$, then a detection signal is generated by the first vibration analysis on the corresponding channel. This first vibration analysis can therefore potentially provide two detection signals, namely a possible detection signal associated with channel 2 and a possible detection signal associated with channel 3.

The second vibration analysis is performed on channels 1, 4 and 5 of accelerometers 16a, 16c. Over a range of data from these channels (e.g. N=8000 samples), digital filtering without phase shifting is performed, using low-pass (preferably cut-off frequency 19.5 Hz) and high-pass (preferably cut-off frequency 150 Hz) finite impulse response (FIR) filters (preferably of order 100), with each measurement data stream filtered in this way having two signals hereinafter denoted $x_{low}$ and $x_{high}$.

The RMS value of each of the filtered streams is then calculated, for example for the signal from the high-pass filter:

$$RMS_{high} = \sqrt{\frac{1}{N}\left[\sum_{i=1}^{N}(x_{high})^2\right]} \quad \text{[Math 2]}$$

where $RMS_{high}$ is the RMS value from the high-pass filter and N is the number of samples.

Then, an "energy ratio" corresponding to the RMS value of the signal from the high-pass filter divided by the RMS value of the signal from the low-pass filter is calculated: $ER=RMS_{high}/RMS_{low}$, where ER is the energy ratio, $RMS_{high}$ is the RMS value of the signal from the high-pass filter and $RMS_{low}$ is the RMS value of the signal from the low-pass filter Each "energy ratio" of channels 1, 4 and 5 has a specific predetermined energy ratio threshold.

For a detection signal to be generated by the second vibration analysis, one of the energy ratios must therefore be above its predetermined specific energy ratio threshold.

It should be noted that the thresholds used in both vibration analyses could also be modified depending on the type of aerodyne 10 and/or the type of main rotor 14.

Preferably, the first vibration analysis and the second vibration analysis are performed simultaneously by the data processing unit 20. Indeed, since a significant increase in the energy of the vibration intensity at high frequencies is not a feature specific to the state of vortex rings, it follows that the combination of both vibration analyses is preferable in order not to generate false alarms.

Preferably, the data processing unit 20 is configured to detect the approach of a vortex ring state and issue an alarm when the first vibration analysis and the second vibration analysis simultaneously generate at least one detection signal, thereby avoiding the generation of false alarms.

More preferably, the data processing unit 20 is configured to detect the approach of a vortex ring state and generate an alarm when at least three detection signals from the first and second vibration analyses are generated simultaneously, thereby further avoiding the generation of false alarms and improving the reliability of detecting the approach of the vortex phenomenon.

The data processing unit 20 may be further configured to use at least one of the following measurements, provided by the basic instrumentation of the rotary wing aerodyne 10, to detect the approach of a vortex ring state: measuring the indicated speed of the rotary wing aerodyne 10, measuring the vertical speed of the rotary wing aerodyne 10, and measuring the rotation speed of the main rotor 14 of the rotary wing aerodyne 10, so as to obtain additional information about the flight domain in which the rotary wing aerodyne 10 is at the current time. This avoids false alarms if the vibration level increases significantly while the aerodyne 10 is clearly outside the vortex domain (for example, during dynamic manoeuvres at high forward speeds, or during a climbing flight).

In each of the first and second vibration analyses, the indicated speed measurement and the vertical speed measurement may, for example, be used by the data processing unit 20 in the following manner: generating the detection signal only if in addition the indicated speed measurement is less than 25 knots and the vertical speed measurement is less than −700 feet per minute.

The detection device according to the present invention may also comprise a warning unit (not shown in FIGS. 3 and 4) connected to the data processing unit 20 and configured to generate a vortex ring state approach warning when the data processing unit 20 issues an alarm, said vortex ring state approach warning being at least one of audible, visual and haptic.

The time margin available between the time of detection and the appearance of the vortex phenomenon allows to implement the function of warning the pilot of the aerodyne 10, so that the pilot can avoid the appearance of the vortex ring state by manually changing the piloting of the aerodyne 10.

The warning, generated in the event of approaching vortex ring state in order to alert the crew of the aerodyne 10, may thus be one of an audible warning from at least one loudspeaker disposed in the cabin 17 of the aerodyne 10, a visual warning from at least one light indicator and/or at least one display device provided in the cabin 17 of the aerodyne 10, and a haptic warning (e.g. by haptic feedback on the force feedback control stick of the aerodyne 10).

The rotary wing aerodyne 10 further comprises a flight control system (not shown in FIGS. 3 and 4) connected to the data processing unit 20 and configured to automatically or semi-automatically modify the piloting of the rotary wing aerodyne 10 when the data processing unit 20 issues an alarm, so as to prevent the rotary wing aerodyne 10 from entering the vortex ring state.

The time margin available between the moment of detection and the appearance of the vortex phenomenon thus allows the implementation of a pilot assistance function via the flight control system of the aerodyne 10.

In the event of detection of the approach of the vortex ring state by the detection device installed in the aerodyne 10, the flight control system of the aerodyne 10 can thus automatically or semi-automatically modify the flight parameters of the aerodyne 10 in order to prevent the aerodyne 10 from entering the vortex ring state (by reduction of the rate of descent or actions on the swashplate (longitudinal or lateral), for example).

The data processing unit 20 may also be configured to perform a third vibration analysis comprising: applying a Hilbert transform to the measurement data stream corresponding to the vertical axis Z of the first three-axis accelerometer 16a to extend the real signal into the complex domain; applying a Fast Fourier Transform (FFT) to the Hilbert transformed signal; and filtering the signal obtained by FFT by plus or minus 5 Hz around the fundamental frequency of the main rotor 14 corresponding to the current speed of the main rotor 14 (Frotor=(NR*b)/60, where Frotor is the fundamental frequency of the main rotor 14, NR is the rotation speed of the main rotor 14, and b is the number of blades 15 of the main rotor 14); reconstituting the filtered signal by applying an inverse Fourier transform.

It is then possible to represent the energy distribution of the reconstructed signal in the time-frequency plane via the square of the modulus of the short-term Fourier transform, this representation is called a spectrogram. A spectrogram is therefore produced on the signal previously filtered around the main rotor frequency, from which the non-physical part of the spectrum (negative frequency part) is removed.

As the approach to the vortex state is characterized by an increase in vibration energy, the variation in the signal amplitude is analyzed. For this purpose, the square root of the variance or, equivalently, the root mean square of the deviations of the signal from its mean is calculated (standard deviation) over a sliding window of 0.7 s. A threshold is defined from the average of this standard deviation.

When the standard deviation of the signal is above this threshold, a detection signal is generated. It should be noted that the threshold used in this third vibration analysis could also be modified depending on the type of aerodyne 10 and/or the type of main rotor 14.

In order to make the detection more robust, it is possible to apply the third vibration analysis to a whole part of the measurement channels of the accelerometers 16a, 16b, 16c in order to correlate the analyses and avoid the generation of false alarms. Similarly, it is possible to apply the third vibration analysis to other frequency harmonics of the main rotor 14.

It should be noted that this third vibration analysis is totally independent of the first and second vibration analyses and can replace them. However, for greater robustness, this third vibration analysis can also be associated with the first and second vibration analyses in order to correlate the detections and potentially avoid false alarms.

It is understood that the particular embodiment just described is indicative and non-limiting, and that modifications may be made without departing from the present invention.

The invention claimed is:

1. A detection device for detecting an approach of a vortex ring state for a rotary wing aerodyne, the detection device comprising:
   a set of vibration sensors configured to be distributed in the rotary wing aerodyne or on the rotary wing aerodyne, the set of vibration sensors being configured to detect vibrations at different points of the rotary wing aerodyne at least along the longitudinal and vertical axes of the rotary wing aerodyne; and
   a data processor connected to the set of vibration sensors, the data processor being configured to:
      receive measurement data in real time from the set of vibration sensors,
      process the received measurement data received to calculate in real time a vibration spectrum of the rotary wing aerodyne along at least one of the longitudinal and vertical axes of the rotary wing aerodyne on at least two distinct vibration sensors from the set of vibration sensors,
      detect in real time, by vibration analysis, the approach of the vortex ring state as a function of the calculated vibration spectrum, and
      issue an alarm in the event of detection of the approach of the vortex ring state.

2. The detection device according to claim 1, wherein each vibration sensor is a three-axis accelerometer, the axes of the three-axis accelerometer including a longitudinal axis X corresponding to the longitudinal axis of the rotary wing aerodyne, a transverse axis Y corresponding to a transverse axis of the rotary wing aerodyne and a vertical axis Z corresponding to the vertical axis of the rotary wing aerodyne.

3. The detection device according to claim 2, wherein the vibration sensor set comprises a first three-axis accelerometer configured to be installed in a cabin of the rotary wing aerodyne, a second three-axis accelerometer configured to be installed on a main gearbox of the rotary wing aerodyne, and a third three-axis accelerometer configured to be installed on an engine deck of the rotary wing aerodyne proximate to the center of gravity of the rotary wing aerodyne.

4. The detection device according to claim 3, wherein the data processor is configured to perform at least one of:
   a first vibration analysis on measurement data streams corresponding to the longitudinal axis X and the vertical axis Z of the second three-axis accelerometer comprising, for each of the measurement data streams corresponding to the longitudinal axis X and the vertical axis Z of the second three-axis accelerometer,
      comparing a fundamental frequency of a main rotor of the rotary wing aircraft with a predominant frequency, corresponding to a maximum amplitude level, of the vibration spectrum derived from a discrete Fourier transform on the corresponding measurement data stream, and
      when the difference between the predominant frequency and the fundamental frequency of the main rotor is greater than a predetermined frequency difference threshold, generating a detection signal associated with the corresponding measurement data stream;

a second vibration analysis on measurement data streams corresponding to the vertical axis Z of the first three-axis accelerometer and corresponding to the longitudinal axis X and the vertical axis Z of the third three-axis accelerometer comprising, for each of the measurement data streams corresponding to the vertical axis Z of the first three-axis accelerometer and corresponding to the longitudinal axis X and the vertical axis Z of the third three-axis accelerometer, digital filtering without phase shifting of the corresponding measurement data stream using a low-pass finite impulse response filter and a high-pass finite impulse response filter, calculating an RMS value of the signal from the low-pass filter and an RMS value of the signal from the high-pass filter, calculating an energy ratio corresponding to the RMS value of the signal from the high-pass filter divided by the RMS value of the signal from the low-pass filter, and when the energy ratio is greater than a corresponding predetermined energy ratio threshold, generating a detection signal associated with the corresponding measurement data stream; and a third vibration analysis comprising:

applying a Hilbert transform to the measurement data stream corresponding to the vertical axis Z of the first three-axis accelerometer to extend a real signal into a complex domain, applying a Fast Fourier Transform (FFT) to the Hilbert transformed signal, filtering an obtained FFT signal by plus or minus 5 Hz around a fundamental main rotor frequency corresponding to a current main rotor speed, the fundamental main rotor frequency defined as (NR*b)/60, where NR is the main rotor speed, and b is the number of main rotor blades, reconstructing the filtered FFT signal by applying an inverse Fourier transform, producing a spectrogram on the reconstructed signal and removing a negative frequency part of the spectrum, calculating a standard deviation of the amplitude of the spectrogram over a sliding window of a predefined duration, and when the calculated standard deviation is above a predefined threshold, generating a detection signal.

5. The detection device according to claim 4, wherein the data processor is configured to perform the first vibration analysis and the second vibration analysis simultaneously.

6. The detection device according to claim 5, wherein the data processor is configured to detect the approach of the vortex ring state and to issue an alarm when the first vibration analysis and the second vibration analysis simultaneously generate at least one detection signal.

7. The detection device according to claim 6, wherein the data processor is configured to detect the approach of the vortex ring state and generate the alarm when at least three detection signals from the first and second vibration analyses are generated simultaneously.

8. The detection device according to claim 1, wherein the data processor is further configured to use at least one of the following measurements to detect the approach of the vortex ring state: measuring an indicated speed of the rotary wing aerodyne, measuring a vertical speed of the rotary wing aerodyne, and measuring a rotation speed of a main rotor of the rotary wing aerodyne.

9. The detection device according to claim 1, further comprising a warning system connected to the data processor and configured to generate a vortex ring state approach warning when the data processor issues an alarm, the vortex ring state approach warning being at least one of audible, visual, and haptic.

10. A rotary wing aerodyne comprising:
at least one main rotor configured to provide lift and propulsion to the rotary wing aerodyne; and
the detection device according to claim 1, the set of vibration sensors of the detection device being distributed in the rotary wing aerodyne or on the rotary wing aerodyne.

11. The rotary wing aerodyne according to claim 10, further comprising a flight control system connected to the data processor of the detection device and configured to modify, automatically or semi-automatically, piloting of the rotary wing aerodyne when the data processor of the detection device issues an alarm, to prevent the rotary wing aerodyne from entering the vortex ring state.

12. A method of detecting an approach of a vortex ring state by a rotary wing aerodyne including a detection device and a data processor, the detection device including a set of vibration sensors configured to be distributed in the rotary wing aerodyne or on the rotary wing aerodyne, the set of vibration sensors being configured to detect vibrations at different points of the rotary wing aerodyne at least along the longitudinal and vertical axes of the rotary wing aerodyne, the data processor being connected to the set of vibration sensors, the method comprising, by the data processor of the detection device:

receiving in real time measurement data from the set of vibration sensors;

processing the received measurement data to calculate in real time a vibration spectrum of the rotary wing aerodyne on at least two distinct vibration sensors among the set of vibration sensors;

detecting in real time, by vibration analysis, the approach of the vortex ring state according to the calculated vibration spectrum; and issuing an alarm in case of detection of the approach of the vortex ring state.

13. The detection device according to claim 2, wherein the data processor is further configured to use at least one of the following measurements to detect the approach of the vortex ring state: measuring an indicated speed of the rotary wing aerodyne, measuring a vertical speed of the rotary wing aerodyne, and measuring a rotation speed of a main rotor of the rotary wing aerodyne.

14. The detection device according to claim 3, wherein the data processor is further configured to use at least one of the following measurements to detect the approach of the vortex ring state: measuring an indicated speed of the rotary wing aerodyne, measuring a vertical speed of the rotary wing aerodyne, and measuring a rotation speed of a main rotor of the rotary wing aerodyne.

15. The detection device according to claim 4, wherein the data processor is further configured to use at least one of the following measurements to detect the approach of the vortex ring state: measuring an indicated speed of the rotary wing aerodyne, measuring a vertical speed of the rotary wing aerodyne, and measuring a rotation speed of a main rotor of the rotary wing aerodyne.

16. The detection device according to claim 5, wherein the data processor is further configured to use at least one of the following measurements to detect the approach of the vortex ring state: measuring an indicated speed of the rotary wing aerodyne, measuring a vertical speed of the rotary wing aerodyne, and measuring a rotation speed of a main rotor of the rotary wing aerodyne.

17. The detection device according to claim 6, wherein the data processor is further configured to use at least one of the following measurements to detect the approach of the vortex ring state: measuring an indicated speed of the rotary wing aerodyne, measuring a vertical speed of the rotary wing aerodyne, and measuring a rotation speed of a main rotor of the rotary wing aerodyne.

18. The detection device according to claim 7, wherein the data processor is further configured to use at least one of the following measurements to detect the approach of the vortex ring state: measuring an indicated speed of the rotary wing aerodyne, measuring a vertical speed of the rotary wing aerodyne, and measuring a rotation speed of a main rotor of the rotary wing aerodyne.

19. The detection device according to claim 2, further comprising a warning system connected to the data processor and configured to generate a vortex ring state approach warning when the data processor issues an alarm, the vortex ring state approach warning being at least one of audible, visual, and haptic.

\* \* \* \* \*